United States Patent [11] 3,551,682

[72] Inventors Jean-Claue Kerhoas
Choisy-le-Roi
Michel Paul Marie Metayer, Chilly-
Mazarin; James Remy Albert Teboul,
Montrouge, France
[21] Appl. No. 817,395
[22] Filed Apr. 18, 1969
[45] Patented Dec. 29, 1970
[73] Assignee Compagnie Des Compteurs
Paris, France
a company of France
[32] Priority Apr. 26, 1968
[33] France
[31] No. 149,562

[54] DEVICE FOR MEASURING RELATIVE
DISPLACEMENT BETWEEN PLURAL LIGHT
SOURCES AND A SCALE UTILIZING FREQUENCY
MULTIPLEXING
6 Claims, 13 Drawing Figs.
[52] U.S. Cl..................................................... 250/214,
250/217, 250/227; 356/167, 356/170
[51] Int. Cl..................................................... G01b 11/04,
G02f 1/28, H01j 39/12
[50] Field of Search........................................... 356/167,
170; 250/214, 217, 217SSL, 227, 237

[56] References Cited
UNITED STATES PATENTS
3,502,415 3/1970 Hock............................. 356/167
FOREIGN PATENTS
1,240,962 8/1960 France........................... 356/167
Primary Examiner—James W. Lawrence
Assistant Examiner—T. N. Grigsby
Attorney—Pierce, Scheffler & Parker ABSTRACT: A photoelectric device for measuring relative displacement between a scale provided with equidistant lines and the image of a source on the scale in which the source is constituted by two electroluminescent diodes modulated by two different frequencies, the image of the source being received by a single photoelectric receiver provided with detecting means, the two detected frequencies actuating numbering means.

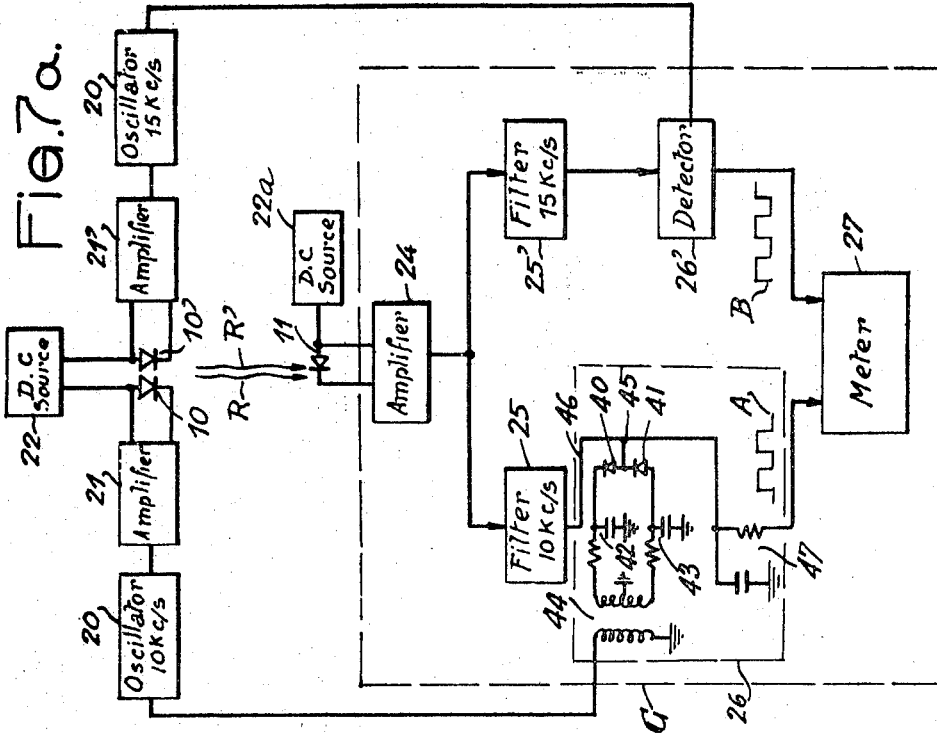
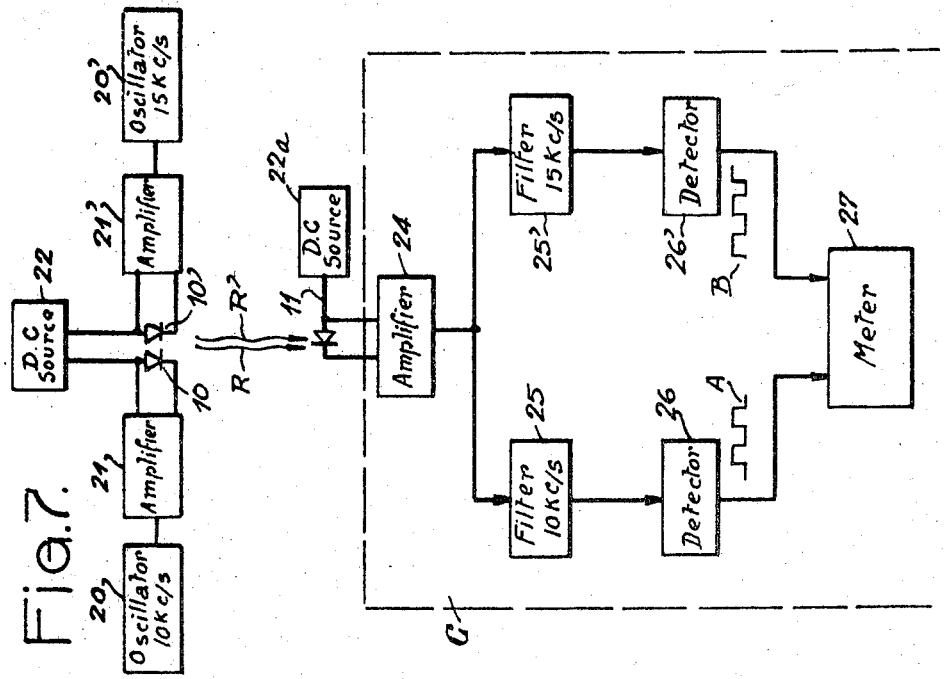

DEVICE FOR MEASURING RELATIVE DISPLACEMENT BETWEEN PLURAL LIGHT SOURCES AND A SCALE UTILIZING FREQUENCY MULTIPLEXING

The present invention relates to a device enabling, on the one hand, the accurate measuring of transfer or rotation displacements, by photoelectric numbering of the lines of a network, and on the other hand, to ascertain the direction of these displacements.

Numerous displacement measuring devices are already known, based on the photoelectric numbering of the contrasted lines of a network of lines perpendicular to the direction of the displacement, or interference fringes produced by means of two webs with appreciably parallel lines, the one fixed, the other, movable. As a light source these devices generally use a filament lamp providing a pencil of light which is optically projected on to a diffraction network or webs.

These known devices have a certain number of disadvantages. On the one hand, the solution consisting of using two webs or two diffraction networks moving parallel to each other is not always acceptable, for it can only be applied to problems of displacement plan upon plan, the distance between the two networks having to remain always very slight and strictly regular. On the other hand, the utilizing of a filament lamp as a light source entails the impossibility of modulating the luminous flux as well as the impossibility of obtaining sources of very small and well defined dimensions, hence the necessity of providing diaphragms or masks.

The using has already been proposed, as light source, of an electroluminescent modulated by the pulses of a generator for effecting the reading of a recording support, particularly a tape or punched card containing data in the shape of opaque or transparent surfaces. In this known device, the beam of light of the diode is focalized according to a flat beam which is projected through the coded tracks of the recording support on a series of radiance detectors whose output signals are amplified by an amplifier tuned on the repetition frequency of the pulses of the generator, and then dealt with in a conditioner.

In this known device, one does not seek to produce an image of the source on a scale, but only to detect whether the light passes or does not pass through each of the tracks of the recording support explored by the flat beam.

When the relative movement between source and support only occurs in one direction, and if the accuracy sought is not too great, this device lends itself to a static position reading. Nevertheless, in a case where the relative displacement between light source and the support may take place in both directions before reaching a stopped position, or even never reaching it (pendular oscillations), this device is no longer adapted to this kind of application and does not afford sufficient accuracy.

The present invention relates to a device making use of electroluminescent diodes as light source so as to measure displacements with very great accuracy by numbering the lines of a network of lines, this device, moreover, being so arranged that it detects the displacement direction, even for the slightest displacements, to the extent of a micron.

The invention thus relates to a photoelectric measuring device of the relative displacement between a network (whose lines are appreciably perpendicular to the displacement direction) and the image of a light source formed on this network by means of an optical system, and in which the light transmitted or reflected by the network is optically projected on to a photoelectric receiver connected to a circuit for numbering or utilizing the lines, and this device is characterized in that said light source is constituted by at least one pair of electroluminescent diodes, modulated by currents with different modulation frequencies and that the photoelectric receiver is formed by a single junction detector followed by filtering means tuned on each of the modulation frequencies.

It is known that an electroluminescent diode is a junction diode emitting light when a direct biasing current is applied to its junction. The diode then provides a luminous power proportional to the current applied, and the emitted light almost is monochromatic: for instance, in the case gallium arsenide diodes, the transmission wave length is centered on 9000 Angstroems, very near to infrared.

The utilizing of at least one pair of electroluminescent diodes also has several advantages for measuring displacements:

a. the diode assembly forming the source is of very slight dimensions, in the region of 100 $\mu$, so that it is easy to obtain, on the network, with a relatively simple optic, an image of this source in the region of 10 $\mu$, or less;

b. the diodes afford a modulation facility by simple current injection on their junction, while permitting a subsequent extremely simple and sensitive detection and a high signal-to-noise ratio: for instance, one modulates fluxes emitted at frequencies of 10 Kc/s and 15 Kc/s and one detects said fluxes after filtering in filters having a band width of one to two hundredths of c/s and being respectively tuned on one of said frequencies. The modulation eliminates the influences of parasitic light; c. the device is easy to put into operation: it only comprises a scale with lines on a glass slip for instance, and the optic can be relatively distant from the scale for about 2 to 3 mm.

This device enables, by means of a network of lines regularly spaced out by a pace of 5 $\mu$ to some hundredths of $\mu$ according to the required accuracy, these lines being drawn on a suitable support, for accurately measuring displacements that can be in the region of a micron or rotations with an accuracy in the region of a few seconds of arc.

For increasing accuracy, the distance of the images from the diodes (in the displacement direction) formed on the network by the optical system is chosen, according to a characteristic arrangement, equal to a quarter of pace of the network, or an entire pace number, plus a quarter.

Moreover, it is possible to increase the luminous flux coming on to the photoelectric receiver by multiplying the number of diodes, which are associated in pairs, each pair comprising any number of diodes whose luminous fluxes are transmitted by means of a bundle of optical fibers for forming a geometrical image on the network.

The numbering of the lines on the scale can be done by the reflection or transmission of the beam of light.

In order to detect the displacement direction, the signals coming from two electroluminescent diodes with different modulation frequencies to be then separated on reception by filtering, are applied to an assembly of logical circuits followed by a reversible counter, numbering taking place in a direct or retrograde direction according to the displacement indicated by the logical assembly.

The accuracy in measuring the displacements means that the respective beams of light from the two light sources are very close to each other (a few microns). On this account, the luminous fluxes transmitted by the network, by reflection or transparency, are very close together geometrically and their separation by optical means would be difficult and would require a mechanical accuracy difficult to obtain. The distinguishing of the two fluxes by means of a different modulation of their sources, enables reception by a single detector, thus eliminating the difficulty referred to above.

Other characteristics of the invention will be revealed by the description which follows, in relation to the accompanying drawing, given by way of nonrestrictive example, and in which:

FIGS. 7, 7a, 9 and 10 are diagrams of the corresponding electric circuits.

FIG. 1 shows an arrangement of the optical elements of the device enabling the numbering of lines to be carried out according to a method by reflection.

Figure 1:
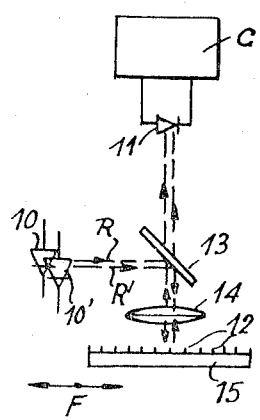
FIGS. 1 and 2 are diagrams of the principle of the device according to the invention.

In the drawing, 10,10' designate electroluminescent diodes used as a light source and modulated to two different frequencies; a semireflecting plate 13 placed at 45° sends part of the luminous flux through an enlarging G objective 14 on to scale 15 comprising a network of contrasted lines 12. The lines 12 made on the scale 15 can be either thin or thick, their thickness being able, at the maximum, to attain the half-pace of the network.

A junction detector 11 or photodiode forms the input of a receiving device C whose maximal sensitiveness is tuned to the transmitting wave-length of the diodes 10,10'.

Figure 3:
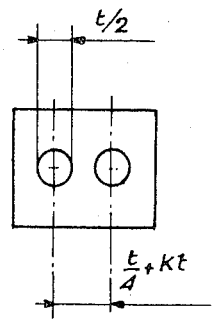
FIGS. 3 to 5 show the relative arrangements of electroluminescent diodes.
Figure 4:
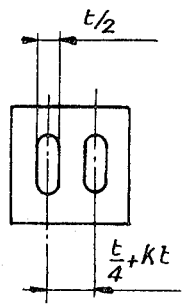

These diodes are, for instance, obtained by diffusion on the same substratum. They are of circular shape, as shown in FIG. 3, or have a lengthened shape parallel to the lines of the network as shown in FIG. 4 and are of very slight diameter or width. These diodes (suitably polarized by different frequency currents) form two sources of infrared rays R,R' which pass through objective lens 14 to form real images of G times the smaller dimension. In order that the dimensions of these images on the network are less than or equal to a half-pace P/2 of the network 12, so that the images coming from the two diodes never cover two consecutive lines, the dimension of the sources must be equal to a value $t/2$ so that $t = GP$.

For another embodiment, the light source may be obtained by means of individual diodes associated with suitably shaped optical fibers for forming two slots-shaped sources.

To increase accuracy, it is desirable that the distance on the network of the images of the centers of the diodes or of the axes of the diodes, or else that the axes of the ends of the optical fibre bundles are staggered in a direction perpendicular to that of the lines of $P/4 + KP$, that is to say, by a quarter of a pace eventually increased by an entire number K of paces. For this, one selects the distance between the sources of the form $t/4 + Kt$.

During a relative movement of the scale 15 in relation to the sources 10,10' according to one of the directions shown by the arrow F, these images are successively reflected by each line of the network and the object 14 repeats them through the plate 13 by reflecting two successive images from whence one deduces the amplitude of the displacement knowing the pace P of the network 12.

Figure 2:
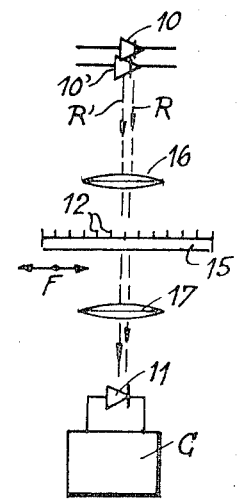

FIG. 2 in which the elements dealing with a similar part have the same reference numerals, shows the arrangement when one applies the method by transmission or transparency. The images of the sources 10,10' are projected by a first objective 16 on to the network 12 of opaque lines, and the light passing through the space between two lines is transmitted by a second objective 17 which repeats an image of the sources on the photodiode 11 of the receiving device R. The spaces are then counted separating two receptions of different modulation, which enables the displacement of the scale 15 to be ascertained.

The first method has the advantage of requiring less space, but both of these two methods can be used in the device according to the invention.

To increase the luminous flux and be able to get over any incidental irregularity of the network, due, for instance, to the presence of dust, it is advantageous to multiply the number of diodes of each pair of diodes 10 and 10'.

Figure 5:
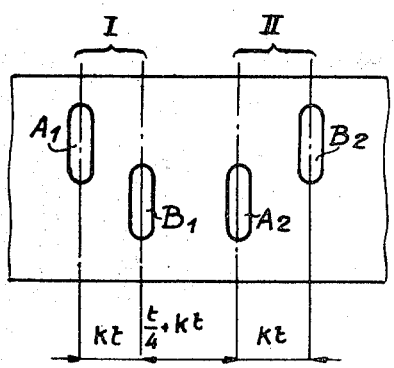

This may be obtained, according to a first embodiment, by multiplying the number of pairs of diodes so as to form two assemblies I, II of diodes, respectively comprising the diodes $A_1B_1$ and $A_2B_2$ staggered by $t/4 + Kt$ (FIG. 5) whose images through the optical system are then staggered by $\frac{P}{4} + KP$;

each assembly has a frequency of different modulation, the diodes of assembly I being, for instance, modulated to 10 Kc/s, those of the assembly II to 15 Kc/s.

This arrangement can be extended to an N number of assemblies forming images respectively staggered by $\frac{P}{2N} + KP$ and using N frequencies of different modulation.

In other words, to each diode of an assembly there corresponds at least one diode of another assembly, whose images are respectively distant of $P/4 \left( \text{or } \frac{P}{2N} \right) + KP$ and modulated to a different frequency.

Figure 6:
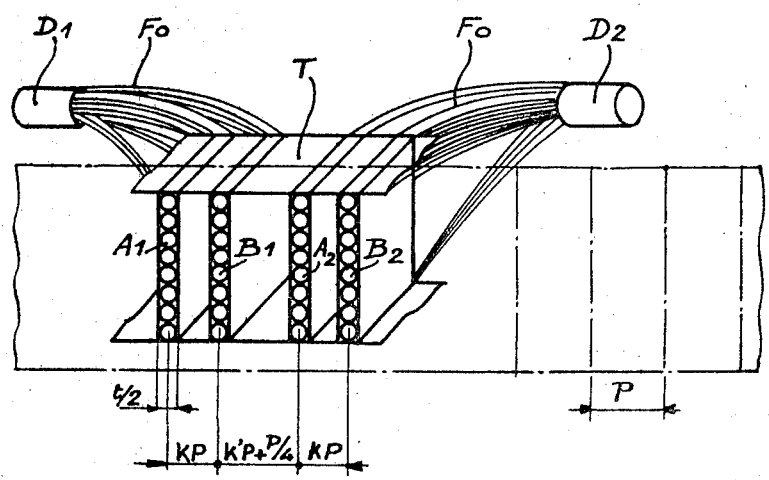
FIG. 6 is a diagrammatical perspective view of an embodiment of one of the members of the invention.

According to another embodiment, the radiance emitted by one or more diodes modulated at one and the same frequency is transmitted on the network of lines by means of optical fibre bundle whose ends adjoining the network have a rectilinear section parallel to the lines of said network. Then, there is preferably used, the transmission method. FIG. 6 shows diagrammatically the arrangement of the beams of fibers Fo transmitting the light of two diodes or groups of diodes $D_1$, $D_2$, modulated at different frequencies, at a transmitting head T, which is arranged so as to be practically in contact with the network like the reading head of a magnetic recorder. Fibers F0 are aligned in the head T at their end, for instance according to four segments of straight lines parallel to the lines of the network shown by mixed lines. The diode $D_1$ lights up the two segments $A_1$, $B_1$, and the diode $D_2$ the two segments $A_2$, $B_2$. In this method of fitting, the diodes can be of any shape and their dimensions can be much greater than the embodiments with an optical system of the kind of FIGS. 1 and 2. The diodes can also be placed in any position and indifferently in relation to each other. The dimension conditions to be compled with apply to the fibers which must have a diameter less than or equal to a half-pace P/2 of the network, and the segments $A_1$, $B_1$, $B_1 A_2$, $A_2 B_2$ must be respectively equal to KP, K'P + P/4, KP, (K' is an entire number of paces equal to or different from K).

Figure 9:
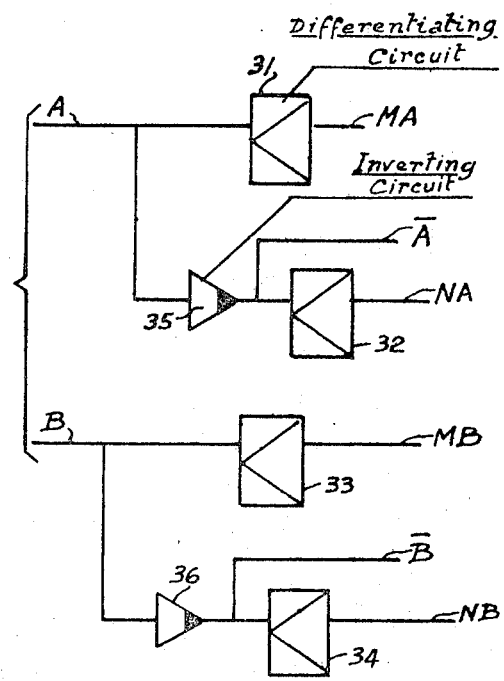
Figure 10:
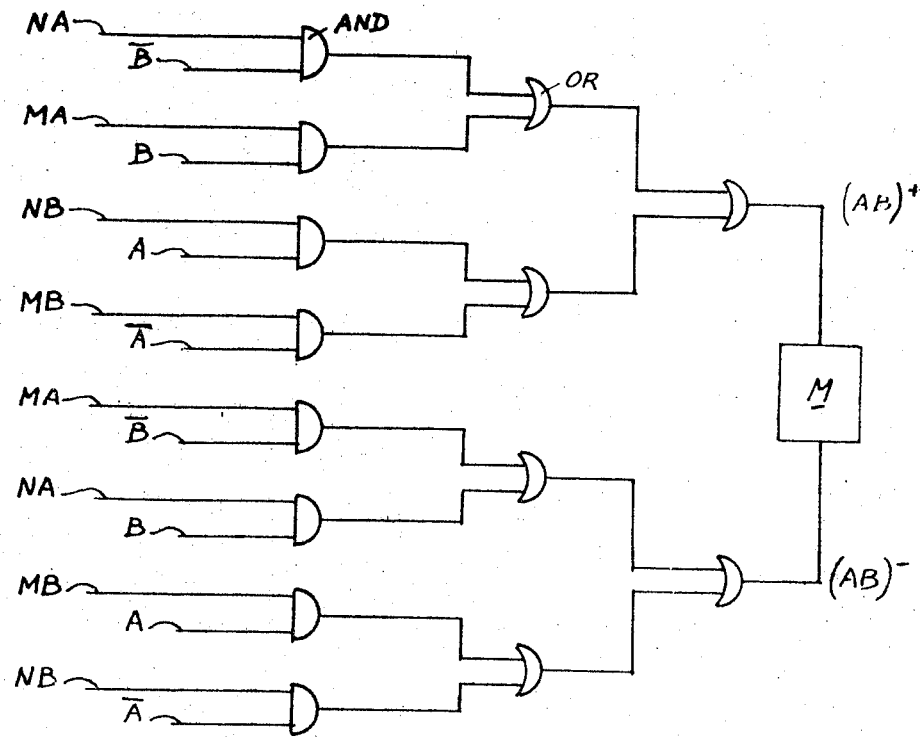

The electrical circuit diagram is shown in FIGS. 7, 9 and 10. In FIG. 7, 10 and 10' designate electroluminescent diodes biased with a direct current coming from a generator 22. Oscillators 20,20' respectively tuned, for in stance, to 10 Kc/S and 15 Kc/s supply the diodes 10,10' with sinusoidal current by means of amplifiers 21,21', respectively.

The modulated light beams R,R' emitted by these diodes are received by the photodiode 11, after reflection or transmission by transparency by the network whose relative displacement requires to be measured, the photodiode 11 being biased with a direct voltage supplied by an auxiliary generator 22a.

The diode 11 is connected to an amplifier 24 followed by two band-pass filters 25,25' respectively tuned on the aforementioned frequencies of the oscillators 20,20'. Detection and shaping circuits 26 and 26' provide low frequency signals A and B that will be referred to later on.

The sinusoidal-shaped luminous signals R and R', of respective frequencies 10 Kc/s and 15 Kc/s emitted by the diodes 10,10' are modified by the presence of each line of the network encountered by these light beams which are received by the diode 11. The signals then have the appearance shown at A', B' in FIG. 8.

Figure 8:
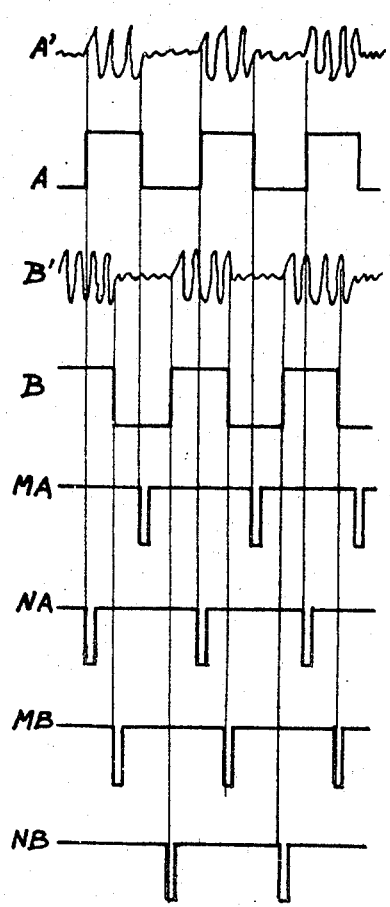
FIG. 8 shows the shape of signals at various points of the circuits.

After amplifying in the circuit 24, the signals A' and B' are separated by the tuned filters 25,25' and are then detected and shaped by the circuits 26,26' at whose output the signals occur in the shape by the circuits shown at A and B in FIGS. 7 and 8.

One can also operate in squared signals for simplifying the shaping of the signals A and B as shown in FIG. 7a. The oscillators 20 and 20' are then square wave generators supplying the diodes 10 and 10'. The square signals coming from the oscillators 20 and 20' are respectively applied on to the circuits 26 and 26' so as to effect a double synchronous detection.

One embodiment of a detector or synchronous demodulator forming then the circuits 26 and 26' is shown in FIG. 7a with regard to the circuit 26 receiving the signal A'. The detector is formed by a synchronous switch comprising two diodes 40, 41 connected to two filters RC 42, 43 and receiving by a transformer 44 the square carrier wave coming from the oscillator 20. The output 45 of the synchronous switch is connected by a wire 46 to the filter 25 (FIG. 7) and thus receives the signal comprising the carrier wave and modulation signal. A filter RC 47 connected at 45 to the synchronous switch provides the signal A (FIG. 8) at its output.

For detecting the displacement direction of the lines, a phasemeter 27 is provided in FIGS. 7 and 7a which receives the signals A and B on its two inputs. The phasemeter 27 detects the one of the two signals which is in front of the other, hence one immediately deduces the displacement direction.

This detecting of the displacement direction, designated in that which follows by the notation (AB)+ and (AB)−, can be effected by a logical device as shown in FIGS. 9 and 10.

The signals A and B are first of all applied to the circuit shown in FIG. 9, where 31—34 designate differentiating circuits forming the negative derivative of said signals A and B, and 35—36 designate inverting circuits. In this way, we obtain inverted signals $\bar{A}$ and at the output of the inverting circuits 35 and 36, as well as signals MA, NA and MB, NB at the output of the differentiating circuits, shown in FIG. 8, these signals corresponding to the sides of the signals A and B.

By supposing that the succession in time of the signals A, B shown in FIG. 8, represents the positive displacement direction (AB)+, we can, for instance, characterize this direction by the logical relation:

$$(AB)+ = (NA.\bar{B} + MA.B) + (NB.A + MB.\bar{A}).$$

and the other direction by:

$$(AB)- = (MA.\bar{B} + NA.B) + (MB.A + NB.\bar{A})$$

The logical relations determined above are only given by way of examples and determine whether a derivative relating to a signal arrives or does not arrive on the phasemeter 27 in coincidence with the other signal.

The logical assembly effecting the preceding operations is shown in FIG. 10 where the various logical functions are carried out by gates AND and OR. The gates AND receive the signals A, B, $\bar{A}$ $\bar{B}$ NA, NB, MA, MB, coming from the circuit shown in FIG. 9. The respective outputs of the various gates AND are connected to the gates OR at whose output the signals (AB)+ and (AB)− are obtained.

The signals (AB)+ and (AB)− thus obtained are applied respectively to the numbering and deducting of a reversible meter M which marks the movement with its sign.

Figure 11:
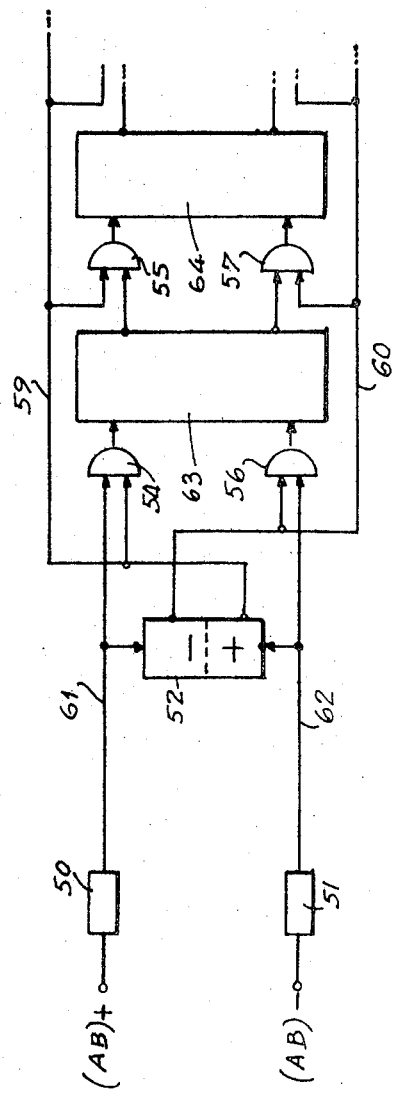
FIG. 11 is an electrical diagram of a characteristic element of the invention.

A reversible meter of this kind can, for instance, be made like that described in the article "Isobelt" by J.A. GOSS in the "Electronic Engineering" magazine, vol. 32, No. 392, of Oct. 1960, or also as shown in FIG. 11 in which the signals (AB)+ and (AB)− are received by means of forming devices 51 on an operating rocker 52 of a decade meter 53. The decade meter 53 comprises gates AND 54, 55 and respectively 56, 57 connected, on the one hand, to one of + outputs, − respectively of the rocker 52 by conductors 59, 60, and on the other hand, to the conductors 61 and 62 of the signal input (AB)+ and (AB)− respectively.

The outputs of said gates AND 54, 55 and 56, 57 are connected to the inputs of two recorders, or pulse counters 63, 64, respectively, of units, tens, etc.

Thus, according to the sign of the signal (AB)+ or (AB)−, the rocker 52 controls the numbering in the direct or retrograde direction.

Figure 12:
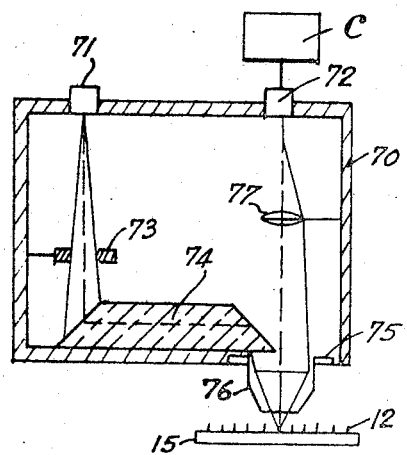
FIG. 12 is a diagrammatical example of a practical embodiment.

FIG. 12 shows diagrammatically a practical example of mounting the optical elements using the method by reflection. A light source 71 comprising the diodes 10, 10' and a photodetector 72 comprising the receiving diode 11 are placed at the top part of a casing 70. The beam of light, limited by a first diaphragm 73, passes through a prism 74 shuttering half of a second diaphragm 75 and directing the beam on to the objective 76. After reflecting on to the line network 12, the reflected beam is projected by the objective 76 and an auxiliary lens 77 on to the photodetector 72 connected to the circuit C described in the foregoing.

For eliminating parasite reflections of the light on the scale 15 formed by a glass slip which supports the network of lines 12, it is advantageous to cover this slip with an antireflecting coating also protecting the lines.

The invention is applicable to all devices necessitating the measuring of displacements or of effecting positionings with accuracy in spite of the presence of parasite vibrations: machine tools, analogic-to-numeric position converters, optical keys or stops, etc. ... the network being able to be movable in relation to the fixed light source or vice versa. Likewise, the scale 15 can be replaced by a disc on which the lines are arranged which can extend radially, said disc being supported by a shaft or spindle or else fixedly mounted.

I claim:

1. A photoelectric device for measuring relative displacement between a scale provided with equidistant lines substantially perpendicular to the direction of displacement and a beam of light projected onto the scale comprising at least one pair of electroluminescent diodes spaced apart a distance related to but different from the distance between the lines on said scale, means for modulating each diode of said at least one pair to form beams having two different modulated frequencies, means for projecting said pair of modulated beams in parallel relation onto the scale, photoelectric means for selectively receiving said beams after having been directed onto the scale in dependence upon whether said beams strike the scale at said lines or between said lines, means for filtering the beams received to separate the beams of different modulated frequencies, and means responsive to the filtered beams for detecting the direction and extent of relative displacement between the scale and the beams of incident light projected thereon.

2. A device as claimed in claim 1 wherein the width of each beam of light projected on the scale is less than half the distance between adjacent lines of the scale.

3. A device as claimed in claim 2 wherein the beams of light projected on the scale are separated a distance equal to ¼ times the distance between adjacent lines of the scale plus a whole number times the distance between adjacent lines of the scale.

4. A device as claimed in claim 2 wherein each beam of light is derived from at least two electroluminescent diodes and the beams having the same modulated frequency being spaced a distance equal to the distance between adjacent lines of the scale divided by the number of diodes forming one beam plus a whole number times the distance between adjacent lines of the scale.

5. A device as claimed in claim 2 and further comprising a bundle of optical fibers for projecting said modulated beams onto the scale, the end of said bundle facing the scale having a rectilinear cross section parallel to the scale.

6. A device as claimed in claim 1 wherein said detecting means comprises an assembly of logical circuits and a reversible meter connected thereto.